United States Patent
Heinsohn

(10) Patent No.: US 11,571,755 B2
(45) Date of Patent: Feb. 7, 2023

(54) PIPE CUTTING DEVICE

(71) Applicant: KNIPEX-Werk C. Gustav Putsch KG, Wuppertal (DE)

(72) Inventor: Andreas Heinsohn, Wuppertal (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 0 days.

(21) Appl. No.: 17/283,351

(22) PCT Filed: Oct. 8, 2019

(86) PCT No.: PCT/EP2019/077181
§ 371 (c)(1),
(2) Date: Apr. 7, 2021

(87) PCT Pub. No.: WO2020/074487
PCT Pub. Date: Apr. 16, 2020

(65) Prior Publication Data
US 2022/0001470 A1 Jan. 6, 2022

(30) Foreign Application Priority Data
Oct. 9, 2018 (DE) ...................... 10 2018 124 817.2

(51) Int. Cl.
*B23D 21/08* (2006.01)
*B26D 3/16* (2006.01)

(52) U.S. Cl.
CPC ............. *B23D 21/08* (2013.01); *B26D 3/169* (2013.01)

(58) Field of Classification Search
CPC ......... B23D 21/08; B23D 21/06; B23D 3/169
See application file for complete search history.

(56) References Cited

U.S. PATENT DOCUMENTS 3,022,575 A * 2/1962 Wright ................... B23D 21/08
D8/60
3,100,934 A 8/1963 Jonasson
(Continued)

FOREIGN PATENT DOCUMENTS

CN 203018824 U * 6/2013 ............. B23D 21/08
CN 205479207 U * 8/2016
(Continued)

OTHER PUBLICATIONS

English translation of DE9214128. (Year: 1993).*
International Search Report of PCT/EP2019/077181, dated Jan. 10, 2020.

*Primary Examiner* — Jennifer S Matthews
(74) *Attorney, Agent, or Firm* — Collard & Roe, P.C.

(57) ABSTRACT

A pipe cutting device with a positioning element and a counter-support, which are formed on a c-shaped working head, wherein the working head also transitions into a foot part that can also be used as a grip region, and the positioning element can be displaced relative to the foot part to change an opening width of the working head, wherein the positioning element can also be fixed on the foot part by a detent device, which has a hand-operable engagement element that interacts with a receiving part to fix the detent. In order to improve the design in terms of handling, the engagement element is situated on the positioning element and can be displaced together with the positioning element relative to the receiving part.

8 Claims, 8 Drawing Sheets

(56) References Cited

U.S. PATENT DOCUMENTS

| | | | | |
|---|---|---|---|---|
| 3,376,638 | A * | 4/1968 | Bjalme | B23D 21/08 411/433 |
| 6,539,634 | B2 | 4/2003 | Merle et al. | |
| 10,773,319 | B2 * | 9/2020 | Xu | B23D 33/025 |
| 2009/0049697 | A1 * | 2/2009 | Williams | B23D 21/08 83/13 |
| 2010/0154223 | A1 * | 6/2010 | Chiu | B23D 21/08 30/95 |
| 2010/0199499 | A1 * | 8/2010 | Dibble | B23D 21/08 30/102 |

FOREIGN PATENT DOCUMENTS

| | | | | |
|---|---|---|---|---|
| CN | 205534080 | U * | 8/2016 | |
| CN | 106270739 | A * | 1/2017 | |
| CN | 213053018 | U * | 4/2021 | |
| DE | 9214128 | U1 * | 1/1993 | |
| DE | 102011056040 | A1 * | 6/2013 | ............ B23D 21/06 |
| EP | 1 166 927 | A1 | 1/2002 | |
| EP | 1243367 | A1 * | 9/2002 | ............ B23D 21/08 |
| GB | 2296886 | A * | 7/1996 | ............ B23D 21/06 |
| GB | 2 333 732 | A | 8/1999 | |
| JP | 2016-034695 | A | 3/2016 | |
| KR | 101474885 | B1 * | 12/2004 | |
| KR | 101832192 | B1 * | 2/2018 | |
| WO | WO-0158634 | A1 * | 8/2001 | ............ B23D 21/08 |

\* cited by examiner

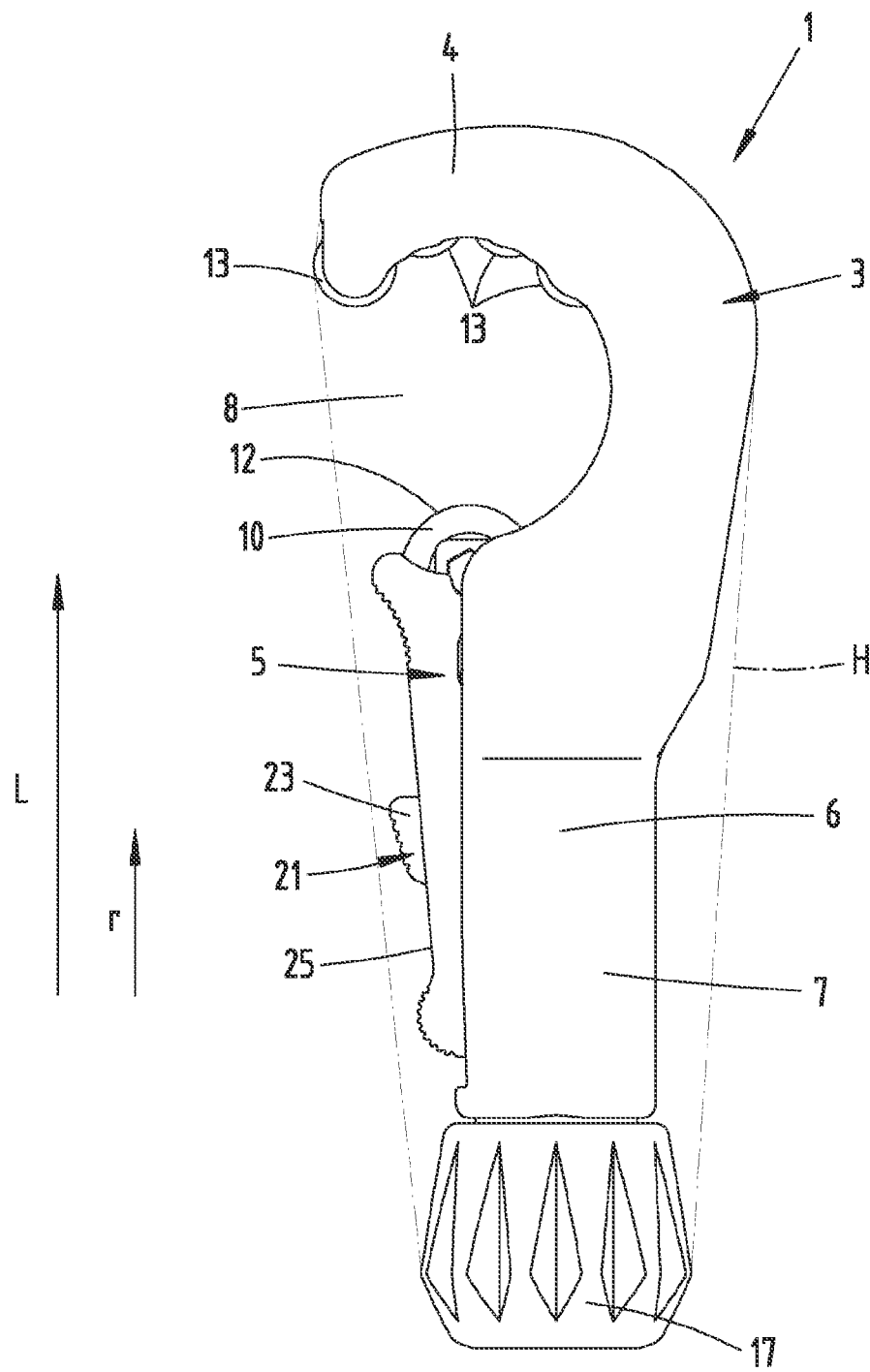

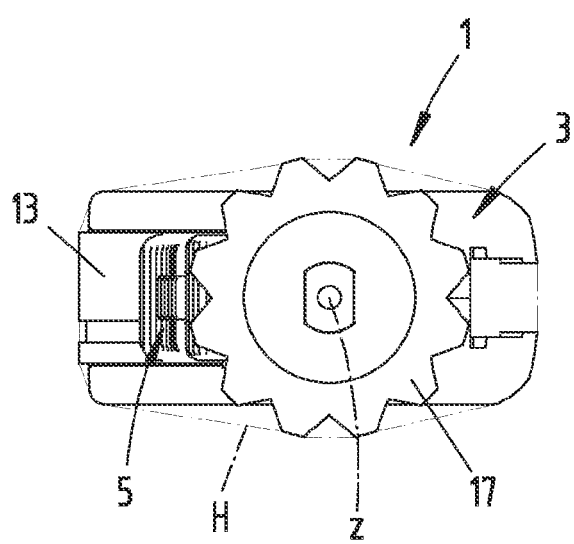
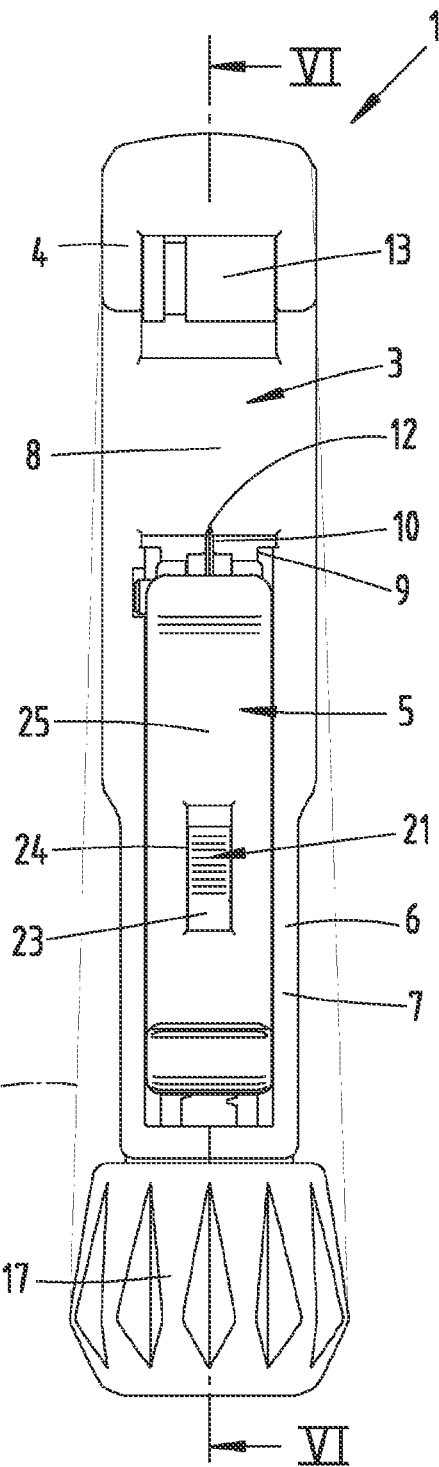

PIPE CUTTING DEVICE

CROSS REFERENCE TO RELATED APPLICATIONS

This application is the National Stage of PCT/EP2019/077181 filed on Oct. 8, 2019, which claims priority under 35 U.S.C. § 119 of German Application No. 10 2018 124 817.2, filed on Oct. 9, 2018, the disclosure of which is incorporated by reference. The international application under PCT article 21(2) was not published in English.

TECHNICAL FIELD

The invention pertains to a pipe cutting device with a positioning element and a counter-support, which are formed on a C-shaped working head, wherein the working head also transitions into a foot part that can also be used as a grip region and the positioning element can be displaced relative to the foot part in order to change an opening width of the working head, and wherein the positioning element can also be fixed on the foot part by means of a detent device, which has a hand-operable engagement element that interacts with a receiving part in order to fix the detent.

PRIOR ART

Pipe cutting devices particularly are known from sanitary installation technology and from pipeline construction. Such a pipe cutting device advantageously makes it possible to separate, preferably in a chipless manner, a pipe section consisting, for example, of mild steel, V2A, cast iron, brass or also of a thermoplastic polymer with a circular cut produced with at least one revolving cutting knife. In this case, the active element may be a hardened cutting wheel that has a wedge-shaped profile and consists, for example, of a high-speed tool steel, if applicable of a hard metal.

It is furthermore known to intentionally release the positioning element from an otherwise normal detent fixation in order to quickly or roughly adjust the opening width, wherein the engagement element that serves for the detent fixation is to this end exposed for manual actuation.

Such a pipe cutter is known, for example, from U.S. Pat. No. 3,100,934 A. The pipe cutter illustrated and described in this publication has a rough adjustment option for roughly adjusting the opening width between the positioning element and the counter-support.

SUMMARY OF THE INVENTION

In light of the above-described prior art, a technical objective can be seen in improving the design of a pipe cutting device of the type in question, particularly in terms of its handling.

According to a first inventive idea, this objective is potentially attained with a pipe cutting device, in which it is proposed that the engagement element is formed on the positioning element and can be displaced relative to the receiving part together with the positioning element.

Convenient handling of the pipe cutting device is achieved as a result of the proposed design. The arrangement of the engagement element on the positioning element also allows a one-handed operation of the pipe cutting device in the course of an adjustment, particularly a rough adjustment, during which the detent fixation is disengaged. In this way, the engagement element can be advantageously arranged on the grip, e.g. such that it can be actuated with a thumb, wherein the positioning element furthermore can optionally and preferably be acted upon with the actuated engagement element in order to realize the preferred displacement of said positioning element.

The displacement of the positioning element preferably can be a linear sliding displacement.

The engagement element can be displaced relative to the preferably stationary receiving part together with the positioning element once the detent fixation has been disengaged as a result of an actuation of the engagement element.

Another potential advantage achieved as a result of the proposed solution can be seen in that the external boundaries of the pipe cutting device—e.g. with respect to a projection of the pipe cutting device into a plane extending perpendicular to the direction of displacement of the positioning element—essentially remain unchanged regardless of the displacement position of the positioning element relative to the working head. The pipe cutting device as a whole can therefore be advantageously handled regardless of the displacement position of the positioning element. In this context, it is preferred that the engagement element can be easily reached in any displacement position of the positioning element. When the grip region formed by the foot part of the pipe cutting device is gripped normally, the positioning element can according to a preferred embodiment be displaced over the entire possible displacement path during a corresponding and preferred thumb actuation without having to change one's grip.

Other characteristics of the invention are frequently described below, as well as in the description of the figures, in their preferred association with the object of claim 1 or with characteristics of other claims. However, they may also be important in association with only individual characteristics of claim 1 or the respective other claim or independently.

According to a preferred embodiment, the receiving part may be formed on a spindle part, which is stationary in the foot part with respect to a movement in the direction of a longitudinal axis of the receiving part. For example, such a spindle part may on the side of its outer wall have a profiling, e.g. in the form of an external thread, for interacting with a corresponding counter-profiling of the engagement element.

The spindle part furthermore may be rotatable about its longitudinal axis, which may be aligned parallel to the longitudinal axis of the receiving part, in order to precisely adjust the opening width. In this context, the receiving part interacting with the engagement element particularly may be realized in the form of an external thread formed on the outer surface of the spindle part. Accordingly, a precision adjustment of the opening width can be carried out in the detent fixation position in that the positioning element is displaced in a sliding manner by means of the engagement element, which is engaged with the external thread of the spindle part, as a result of a rotational displacement of the spindle part about the longitudinal axis of the spindle part.

A handle may be provided on the foot part, e.g. on the end facing away from the counter-support, in order to rotate the spindle part. Due to the fact that the spindle part is arranged in the foot part stationary in the direction of the longitudinal axis of the receiving part and in the direction of the longitudinal axis of the spindle part, the handle part acting upon the spindle part may according to a preferred embodiment also be arranged in a correspondingly stationary manner in this direction.

The positioning element may be held in the grip region and/or the foot part in a form-fitting yet displaceable manner. In this respect, a carriage guide or also a groove guide may be provided for the positioning element. This makes it possible to realize, in particular, a linear displacement of the positioning element.

The positioning element may also be displaceable between a stop on the working head and a stop on the foot part. In this case, the stop on the foot part preferably can define the greatest opening width of the working head possible. The stop on the working head can define the smallest opening width, wherein the section of the working head, which forms this stop and preferably interacts with the positioning element, may be realized such that it faces away from the counter-support and is associated with a region of the working head that transitions into the foot part.

Advantageous handling can furthermore be achieved in that the positioning element is pretensioned into a stop position on the foot part by means of a spring. Accordingly, the positioning element may thereby be pretensioned in the direction of a greatest opening width of the working head by means of a spring. The adjustment of the positioning element for reducing the opening width, particularly its sliding adjustment, accordingly takes place against the restoring force of the spring.

This results in the advantageous effect that a displaced positioning element is automatically returned in the direction of the stop position on the foot part or that this return displacement, which is initiated by the user as a result of acting upon the positioning element, is assisted by the spring force after the detent fixation has been disengaged as a result of an actuation of the engagement part.

A quick adjustment of the positioning element in the direction of a reduction of the opening width of the working head, which is particularly advantageous in terms of handling, can be achieved in that the detent fixation can be overrun in the direction of a reduction of the opening width. Consequently, such a quick adjustment in the direction of a reduction of the opening width can also be realized without actively disengaging the detent fixation solely as a result of a corresponding actuation of the engagement element in that the positioning element is according to a potential embodiment solely acted upon in the sliding direction. To this end, the engagement element may be realized in such a way that the region interacting with the receiving part allows overrunning of the detent fixation position in at least one direction of displacement. This can be achieved with a corresponding design, e.g. cross-sectional design, of the elements of the engagement part and/or the receiving part forming the detent fixation, but optionally also solely as a result of a corresponding arrangement, e.g. pivoted arrangement, of the engagement element on the positioning element.

The engagement element may furthermore be pretensioned into the engagement position. This can be achieved by providing a spring that presses the engagement element in the direction of the detent fixation with the receiving part. The disengagement of the detent fixation as a result of acting upon the engagement element accordingly takes place against the force of the spring in this case. A displacement of the engagement element also takes place against this spring force during a quick adjustment as a result of overrunning the detent fixation.

According to a preferred embodiment, a cutting element, which preferably is realized, for example, in the form of a cutting knife, particularly in the form of a hardened cutting wheel, may be formed on the positioning element and the counter-support may be formed on a stationary part of the working head. The counter-support may be formed by one or more of guide rollers that in the usage state tangentially contact the pipe to be cut. The counter-support may alternatively also be formed by one or more cutting elements.

In another alternative embodiment, the cutting element may be arranged on the counter-support and the positioning element may carry, for example, the above-described guide rollers.

BRIEF DESCRIPTION OF THE DRAWINGS

The invention is described in greater detail below with reference to the attached drawings that merely show an exemplary embodiment. In these drawings:

FIG. 2 shows a corresponding side view;

FIG. 3 shows a corresponding rear view;

FIG. 4 shows a bottom view of the pipe cutting device;

DESCRIPTION OF THE EMBODIMENTS

Figure 1:
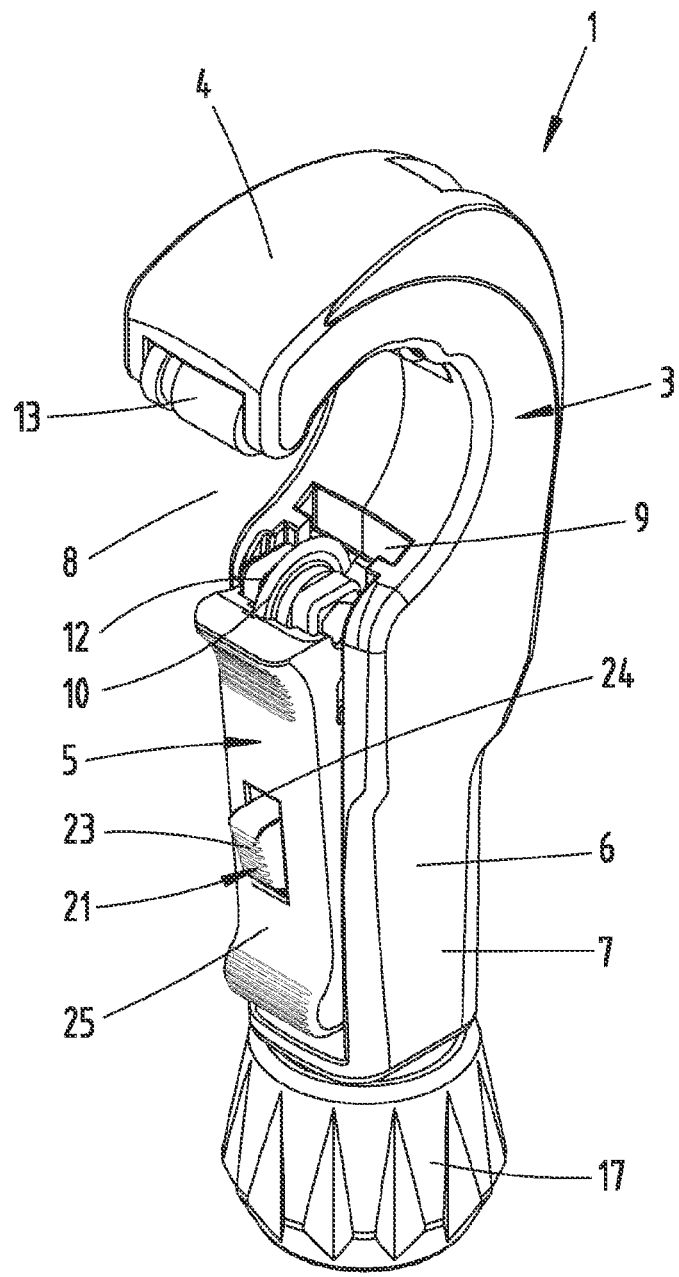
FIG. 1 shows a perspective view of a pipe cutting device of the type in question concerning the position of a maximum opening width of the working head.

A pipe cutting device 1 for cutting to size pipe sections 2 is initially described with reference to FIG. 1.

The pipe cutting device 1 initially has an essentially C-shaped working head 3. One C-limb of the working head 3 forms a counter-support 4, which referred to the entire pipe cutting device 1 is arranged on an end thereof, whereas the opposite C-limb of the working head 3 is essentially formed by a positioning element 5 that can be displaced in a sliding manner.

The C-crosspiece, which respectively connects the C-limbs or the counter-support 4 to the positioning element 5, extends beyond the C-formation in order to form a foot part 7 that simultaneously represents a grip region 6.

Figure 6:
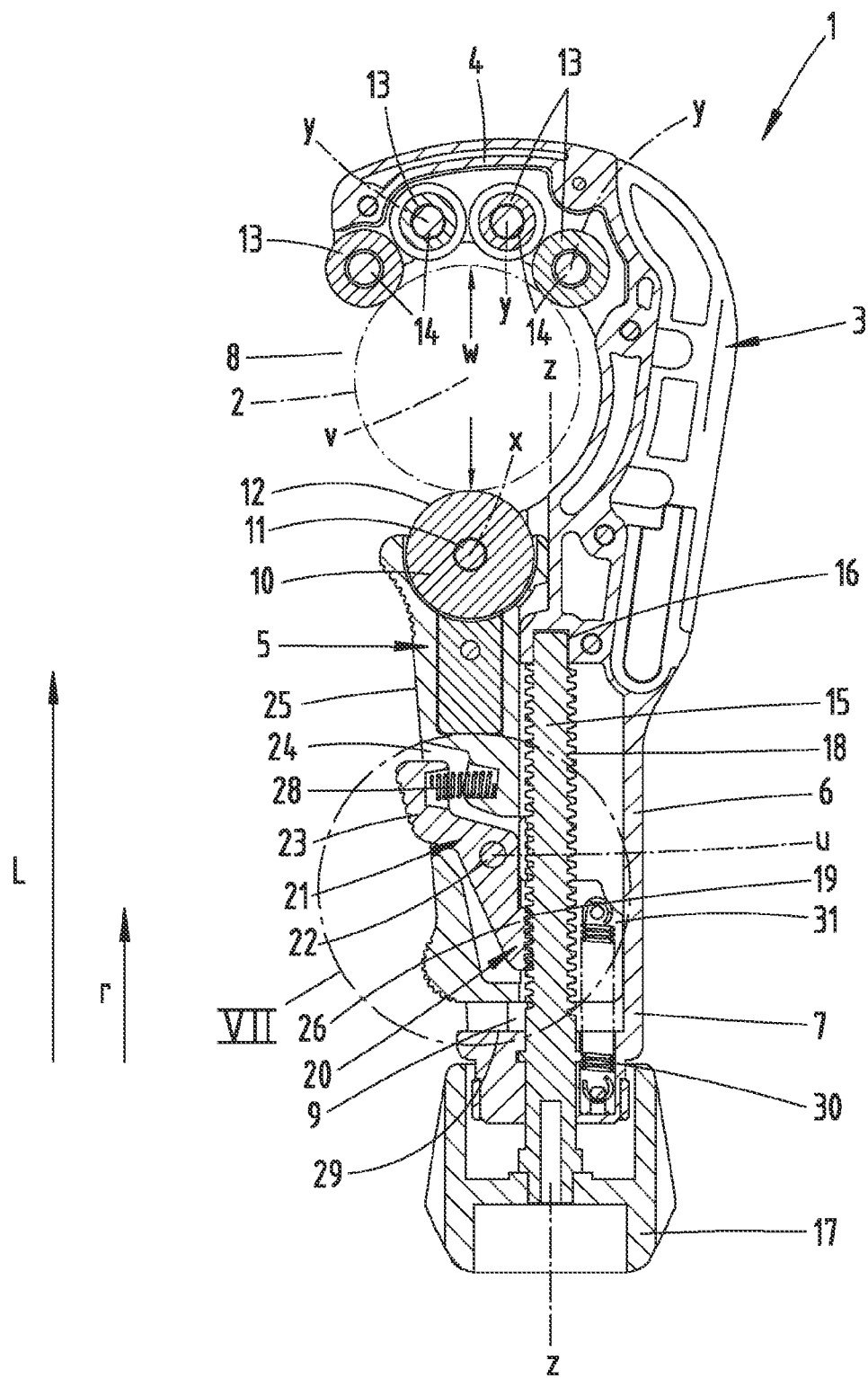
FIG. 6 shows a section along the line VI-VI in FIG. 4.
Figure 9:
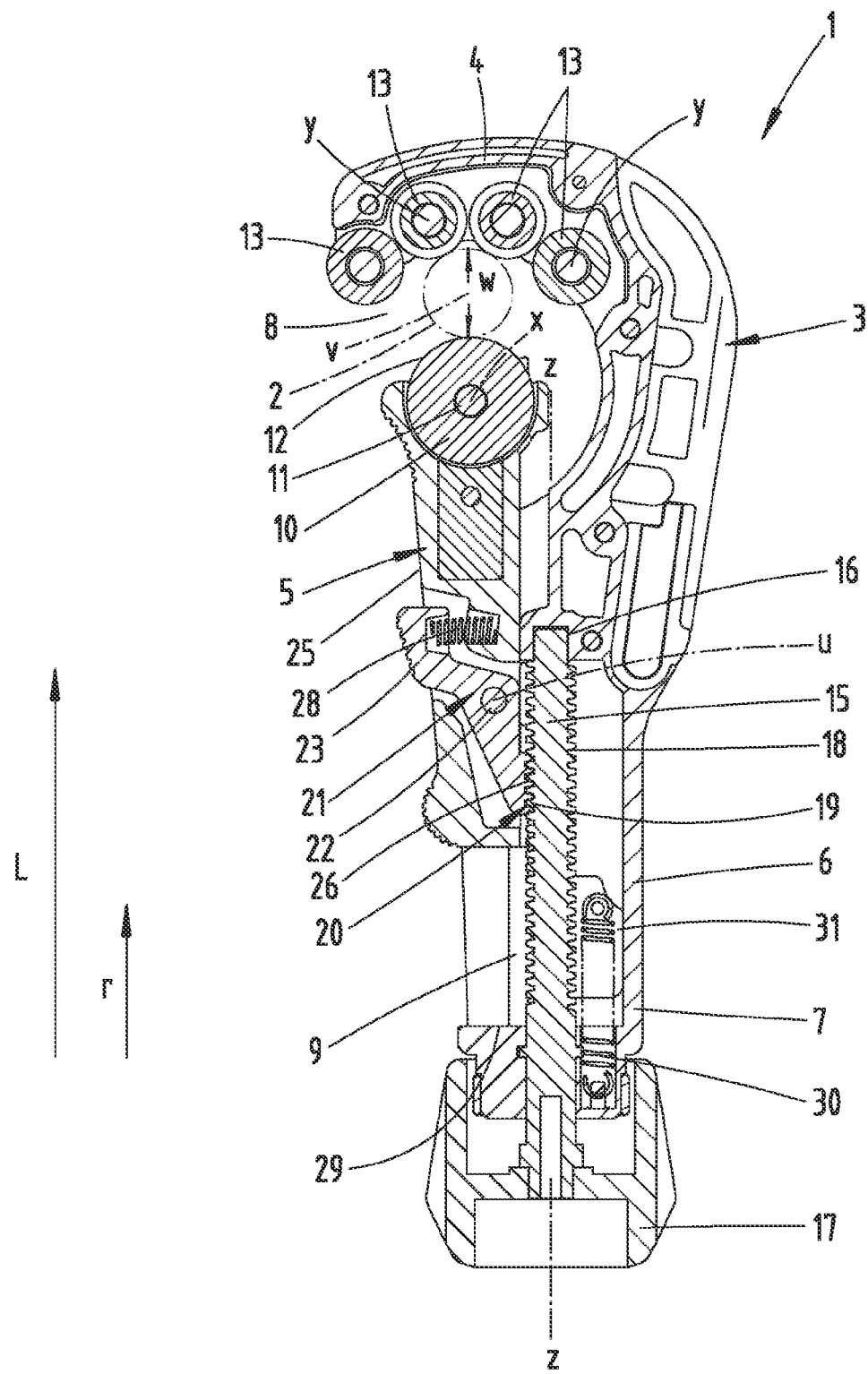
FIG. 9 shows a sectional illustration corresponding to FIG. 6, however, with reduced opening width of the working head in comparison with FIG. 6.

The resulting C-opening in the working head 3 forms the working region, in which the pipe section 2 to be cut is received (compare to FIGS. 6 and 9).

The C-limb of the working head 3 defines in conjunction with the adjoining foot part 7 a longitudinal extent L of the pipe cutting device 1, wherein a corresponding longitudinal dimension may correspond to a multiple of the width of the pipe cutting device 1 extending transverse thereto, e.g. to 2-times to 3-times this width.

The positioning element 5 essentially is displaceable on the respective foot part 7 or grip region 6 in a linear manner in the direction of the longitudinal extent L. To this end, a carriage guide or groove guide 9 preferably can be provided.

The positioning element 5 carries a cutting element 10 in the form of a cutting wheel, which preferably consists of hard metal, on its end facing the C-opening 8. The cutting element 10 is mounted on the positioning element 5 such that it is freely rotatable about an axis of rotation 11 with a geometric axis x, which is aligned perpendicular to the direction of displacement r of the positioning element 5.

The cutting edge 12 of the cutting element 10, which with respect to the axis x extends circumferentially in the form of a circular line, protrudes beyond the outer edge defining the C-opening 8 of the working head 3 and into the C-opening 8 in any displacement position of the positioning element 5.

The outer edge of the working head 3 defining the C-opening 8 may be realized in the form of a circular line as illustrated in the drawings.

In the exemplary embodiment shown, a plurality of guide rollers 13 is provided on the stationary counter-support 4 formed on the working head 3 opposite of the cutting element 10 in the direction of displacement r. For such guide rollers 13 are provided in the exemplary embodiment shown. These guide rollers may be designed identically and respectively have an axis of rotation 14 and a geometric axis y, which preferably extend parallel to the axis of rotation 11 of the cutting element 10 with the geometric axis x.

The geometric axes y of the guide rollers particularly may be arranged along a circular line, wherein the center of the circle may be defined, if applicable, by the edge contour of the C-opening 8.

Figure 7:
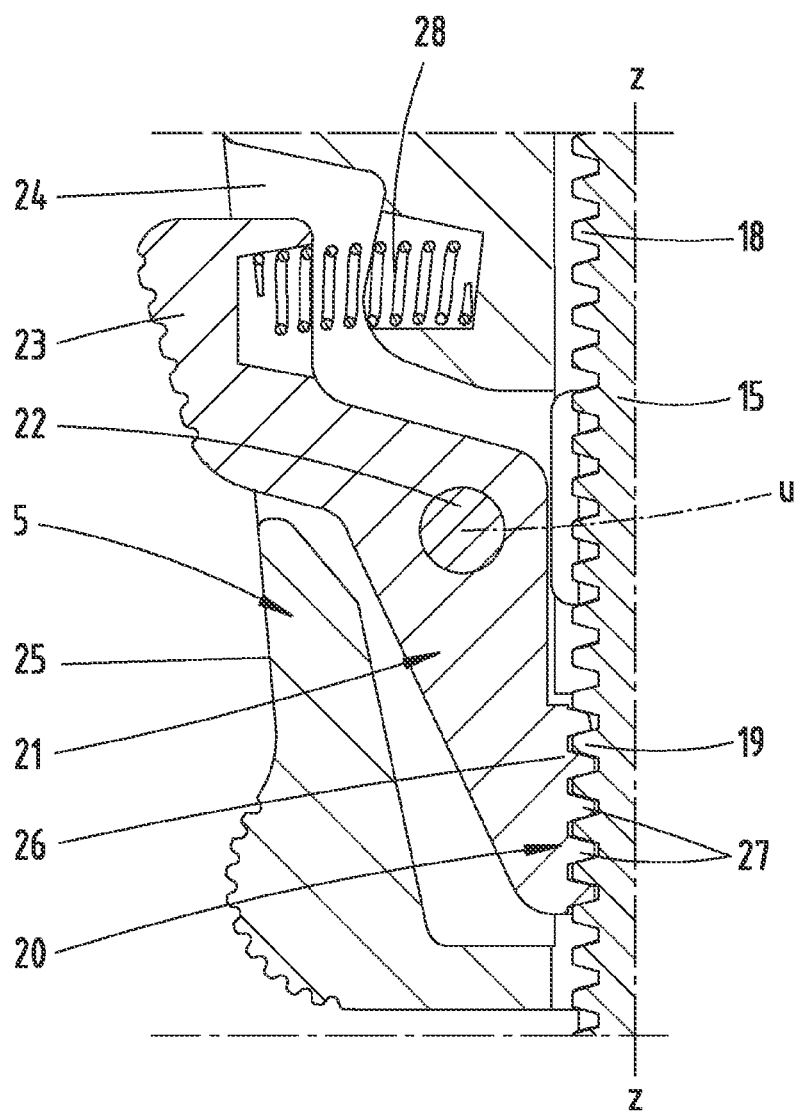
FIG. 7 shows an enlarged detail of the region VII in FIG. 6.
Figure 8:
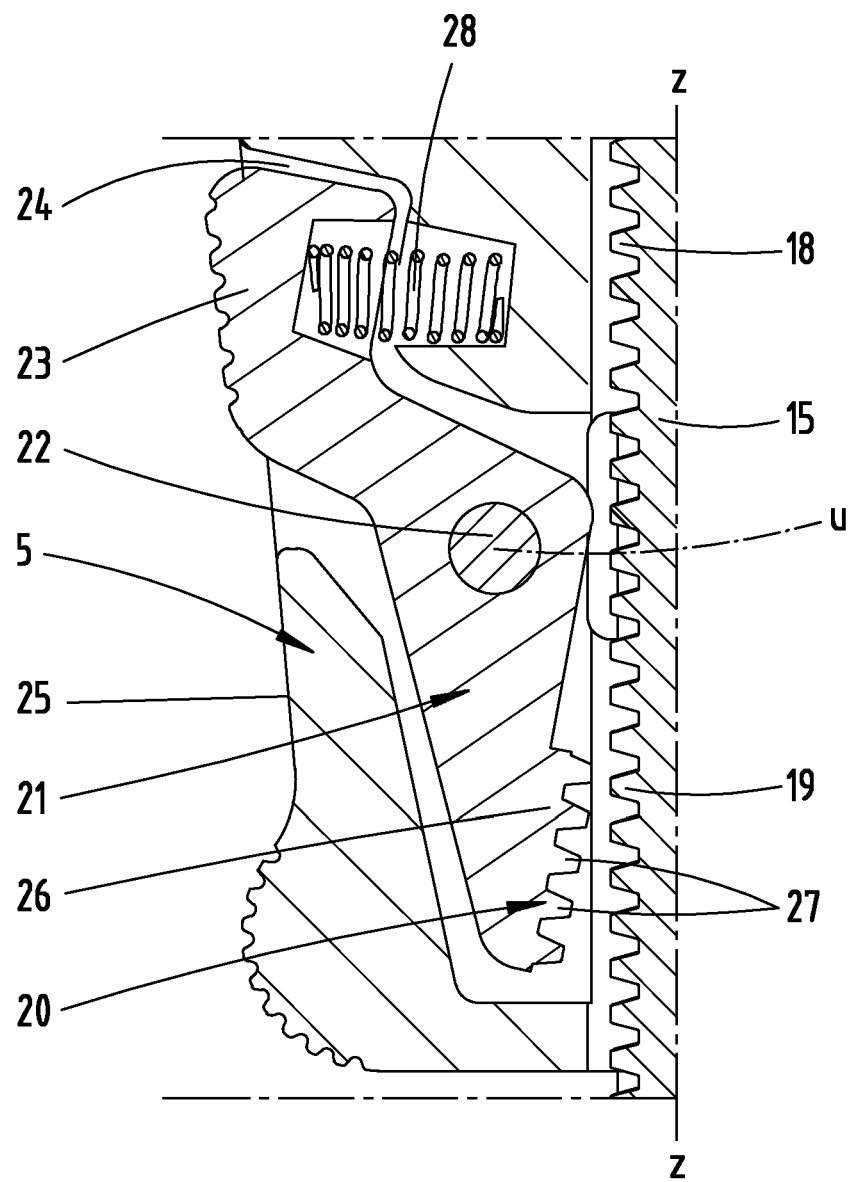
FIG. 8 shows an illustration corresponding to FIG. 7, however, with disengaged detent fixation.

The illustrations in FIGS. 6 and 7, in particular, also show that an opening width w results between the cutting edge 12 of the cutting element 10 and the facing surfaces of the guide rollers 13, which in the course of a cutting process essentially adjoin the surface of the pipe section 12 tangentially, wherein said opening width essentially corresponds to the outside diameter of the pipe section 2 to be cut. The opening width w can be varied as a result of a displacement of the positioning element 5 with the cutting element 10.

A spindle part 15 is furthermore accommodated in the foot part. The geometric longitudinal axis z of said spindle part essentially extends in the direction of the longitudinal extent L and preferably is aligned parallel to the direction of displacement r of the positioning element 5.

The spindle part 15 may be rotatably held in a pot opening 16 of the working head 3 with an end facing the working head 3. The spindle part 15 accordingly is rotatable about its longitudinal axis z, but stationary in the longitudinal direction L of the pipe cutting device 1 or in the direction of the longitudinal axis z, respectively.

The end of the spindle part 15 lying opposite of the end received in the pot opening 16 may extend beyond the end of the foot part facing away from the counter-support 4. A rotary knob 17 is connected to the spindle part 15 in a rotationally rigid manner on this end. The rotary knob 17 serves as a handle for the rotational displacement of the spindle part 15.

The spindle part 15 has an external thread 18, which is preferably realized in the form of a trapezoidal thread, on its outer wall. The spindle part 15 may accordingly be a threaded spindle.

The external thread 18 may serve as a receiving part 19 that forms part of a detent device 20. An engagement element 21 may form another part of this detent device 20.

The engagement element 21 is initially and essentially realized in the form of a lever part, which is mounted such that it can be pivoted about an axis of rotation 22 with a geometric axis u. The axis of rotation 22 preferably can be held in the positioning element 5 such that the engagement element 21 can be displaced in a sliding manner in the direction of displacement r together with the positioning element 5.

The geometric axis u preferably can be aligned parallel to the geometric axes x and y of the cutting element 10 and the guide rollers 13.

The engagement element 21 forms a handling end 23. This handling end protrudes outward beyond the essentially plane handling surface 25 of the positioning element 5 through a window-like cutout 24.

The lever part of the engagement element 21, which faces away from the handling end 23 with respect to the axis of rotation 22, may have a toothing section 26 with a plurality of engagement projections 27, wherein the cross-sectional design and the distances of said engagement projections from one another are with respect to a longitudinal section, in which the longitudinal axis z is illustrated in the form of a line, adapted to the external thread 18 of the spindle part 15 or to the receiving part 19 formed thereby, respectively.

The toothing section 26 may be respectively formed beyond the axis of rotation 22 or the geometric axis u viewed from the C-opening 8 whereas the corresponding handling end 23 may be formed in front of the axis of rotation 22 viewed from the C-opening 8.

The engagement element 21 is pretensioned into the engagement position according to FIGS. 6 and 7 by means of a spring. To this end, a spring 28 such as a cylindrical spring may be provided as shown, wherein said spring is supported on the foot part 7 with one end and its other end acts upon the underside of the handling end 23 of the engagement element 21. In this way, a load is exerted upon the toothing section 26 in the direction of the respective engagement position with the receiving part 19 or with the external thread 18 due to the resulting lever effect.

Accordingly, the engagement position can only be disengaged by means of a pivoting displacement of the engagement element 21 against the force of the spring 28.

The positioning element 5 may be displaceable between two stop positions, wherein one stop position, which defines the greatest opening width w, may be realized by means of a stop 29 on the foot part 7, and wherein the positioning element 5 can be moved against said stop 29.

The other stop position may define a smallest opening width w, if applicable an opening width w that may correspond to zero, wherein this stop position may furthermore be defined by the contact of the cutting edge 12 of the cutting element 10 on the surface or the surfaces of one or more guide rollers 13.

The positioning element 5 may be spring-loaded in the direction of the stop 29 that defines the greatest opening width w. To this end, a spring 30 such as a cylindrical tension spring may be provided as shown, wherein one end of said spring is arranged on the foot part 7 and its other end engages on an extension arm 31 of the positioning element 5.

The displacement of the positioning element 5 in the direction of displacement r for reducing the opening width w accordingly takes place against the force of the spring 30, which has the tendency to press the positioning element 5 in the direction of the stop 29 once the detent engagement in the detent device 20 is disengaged. In this way, a nearly automatic return displacement of the positioning element 5 can be realized after the detent engagement has been disengaged.

The disclosed pipe cutting device 1 therefore is advantageous in terms of handling and allows a precision adjustment, as well as a rough adjustment, of the opening width w. The precision adjustment is realized by rotationally actuating the spindle part 15. The screw-type displacement of the spindle part 15 subjects the engagement element 21, which is engaged with the spindle part, to a linear displacement in the direction of displacement r or opposite to the direction of displacement r, wherein the opening width w can be varied by dragging along the positioning element 5 by means of the axis of rotation 22 of the engagement element 21.

Figure 5:
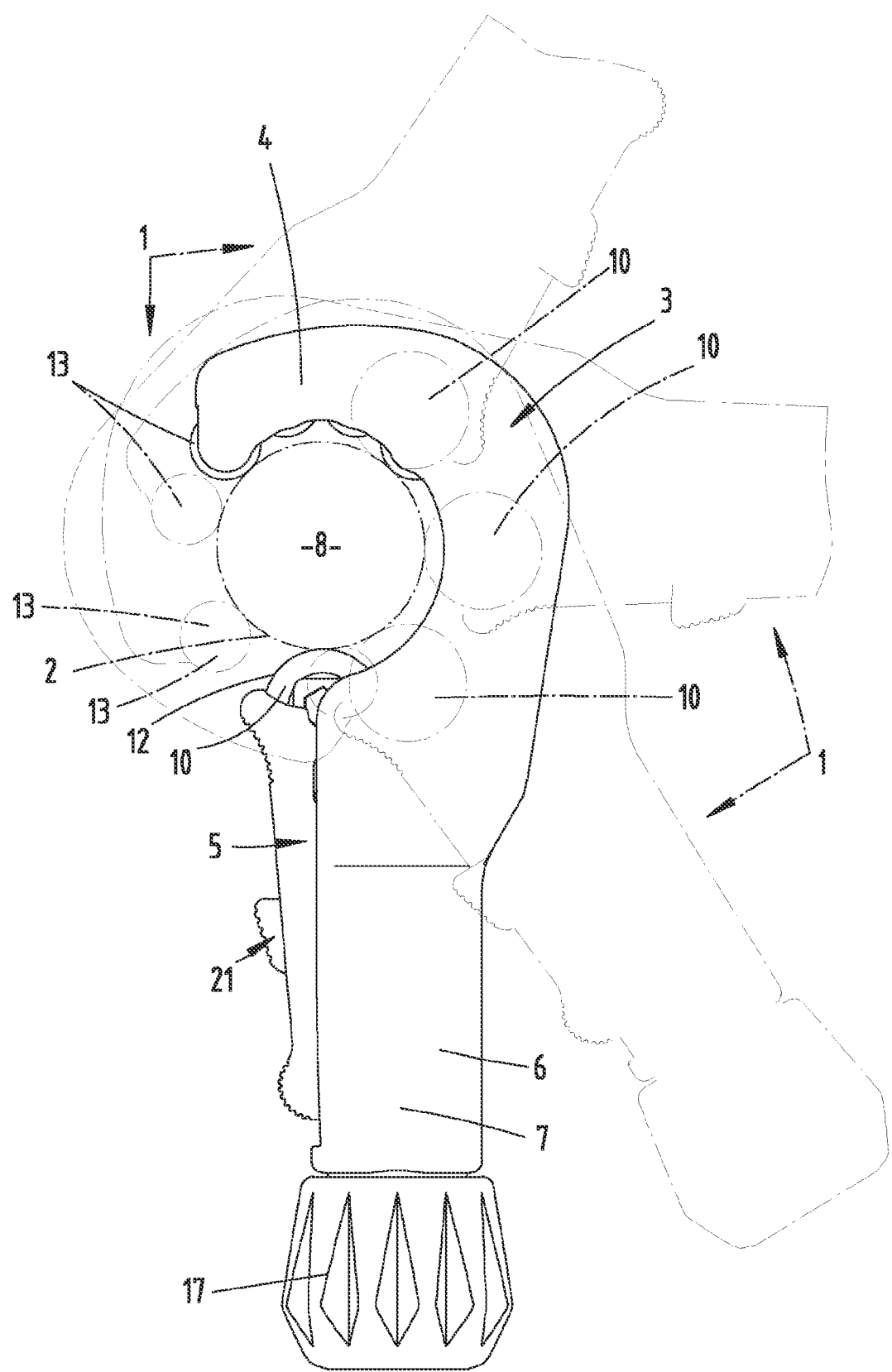
FIG. 5 shows the pipe cutting device in the form of a side view according to FIG. 2 during a schematically illustrated cutting process.

Such a precision adjustment particularly takes place during a cutting process of the type schematically illustrated in FIG. 5, during which a separation of the pipe section 2 is carried out by rotating the entire pipe cutting device 1 about the geometric pipe section axis v, wherein the cutting edge 12 of the cutting element 10 rotating about the pipe section axis v cuts into the material of the pipe section wall, and wherein the cutting element 10 successively burrows itself deeper into the pipe section wall as a result of a corresponding rotational displacement of the spindle part 15 by means of the rotary knob 17. A corresponding precision adjustment or readjustment of the cutting element 10 takes place after each complete revolution or after every second or third complete revolution of the pipe cutting device 1 until the pipe section 2 or its wall is respectively separated.

The positioning element 5 can be moved over the entire possible displacement path by means of the spindle part 15. However, it proved advantageous in terms of handling to advance the positioning element 5, particularly the cutting element 10, toward the pipe section 2 to be cut by means of a rough adjustment. The correspondingly required displacement path is inevitably dependent on the diameter of the pipe section 2 and on the starting position of the positioning element 5.

The rough adjustment preferably can also be used for the return displacement in the direction of the stop 29 on the side of the foot part.

To this end, the engagement element 21 can be actuated in the region of the handling end 23 such that the detent engagement between the toothing section 26 and the receiving part 19 or the external thread 18 is respectively disengaged. The positioning element 5 with the connecting element 10 and the engagement element 21 is displaced in a sliding manner in the direction of displacement r or opposite to the direction of displacement r along the groove guide 9 by means of the actuated engagement element 21 and, if applicable, by supporting the thumb actuating the engagement element 21 on the handling surface 25. Once this displacement is completed and the engagement element 21 is no longer acted upon, the engagement element 21 and the receiving part 19 are once again in a detent engagement position, from which a further precision adjustment can be carried out as a result of rotating the spindle part 15.

The toothing section 26 of the engagement part 21 practically is dragged along in a trailing manner referred to the axis of rotation 22 of the engagement element 21 in the direction of displacement r, i.e. in the direction of displacement that reduces the opening width w. A detent fixation, which can be overrun in the direction of a reduction of the opening width w, can be achieved due to the preferably trapezoidal cross-sectional design of the toothing of the engagement element 21, as well as of the receiving part 19 or the external thread 18, respectively. In this way, a displacement of the positioning element 5 for reducing the opening width w by means of a rough adjustment can take place without actively acting upon the engagement element 21, namely by solely acting upon the positioning element 5 in a sliding manner via its handling surface 25.

Such overrunning preferably is impossible in the direction extending opposite to the direction of displacement r as a result of the lever arrangement of the engagement element 21.

The proposed design results in a pipe cutting device 1 that can be advantageously operated with one hand, particularly with respect to the rough adjustment or sliding displacement of the positioning element 5.

The invention also provides a handling advantage to the effect that the pipe cutting device 1 maintains its outside contour, particularly with respect to its length in the longitudinal direction L and its width extending transverse thereto, regardless of the displacement position of the positioning element 5. The pipe cutting device 1 accordingly can extend within a constant enveloping surface of an imaginary envelope H spanning the pipe cutting device 1 in any position of the positioning element. Consequently, the pipe cutting device 1 advantageously requires a working space of identical size around the pipe section to be cut in any position of the positioning element.

The preceding explanations serve for elucidating all inventions that are included in this application and respectively enhance the prior art independently with at least the following combinations of characteristics, wherein two, multiple or all of these combinations of characteristics may also be combined with one another, namely:

A pipe cutting device 1, which is characterized in that the engagement element 21 is formed on the positioning element 5 and can be displaced relative to the receiving part 19 together with the positioning element 5.

A pipe cutting device 1, which is characterized in that the receiving part 19 is formed on a spindle part 15, which is stationary in the foot part 7 with respect to a movement in the direction of a longitudinal axis z of the receiving part 19.

A pipe cutting device 1, which is characterized in that the spindle part 15 is rotatable about its longitudinal axis z in order to precisely adjust the opening width w.

A pipe cutting device 1, which is characterized in that the positioning element 5 is held in the grip region 6 in a form-fitting yet displaceable manner.

A pipe cutting device 1, which is characterized in that the positioning element 5 can be displaced between a stop on the working head 3 and a stop 29 on the foot part.

A pipe cutting device 1, which is characterized in that the positioning element 5 is pretensioned into a stop position on the foot part 7 by means of a spring 29.

A pipe cutting device 1, which is characterized in that the detent fixation can be overrun in the direction of a reduction of the opening width w.

A pipe cutting device 1, which is characterized in that the engagement element 21 is pretensioned into the engagement position.

A pipe cutting device 1, which is characterized in that a cutting element 10 is formed on the positioning element 5, and in that the counter-support 4 is formed on a stationary part of the working head 3.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Pipe cutting device
2 Pipe section
3 Working head
4 Counter-support
5 Positioning element
6 Grip region
7 Foot part
8 C-opening
9 Groove guide
10 Cutting element
11 Axis of rotation
12 Cutting edge
13 Guide roller
14 Axis of rotation
15 Spindle part
16 Pot opening
17 Rotary knob
18 External thread
19 Receiving part
20 Detent device
21 Engagement element
22 Axis of rotation
23 Handling end
24 Cutout
25 Handling surface
26 Toothing section
27 Engagement projection
28 Spring
29 Stop
30 Spring
31 Extension arm
r Direction of displacement
u Axis
v Pipe section axis
w Opening width
x Axis
y Axis
z Longitudinal axis
H Envelope
L Longitudinal extent

The invention claimed is:

1. A pipe cutting device (1) with a positioning element (5) and a counter-support (4), which are formed on a C-shaped working head (3) with an open front side for receiving a pipe and a closed back side, wherein the positioning element is formed on the front side, wherein the working head (3) also transitions into a foot part (7) that is configured to be used as a grip region (6) and the positioning element (5) is configured to be displaced relative to the foot part (7) in order to change an opening width (w) of the working head (3), and wherein the positioning element (5) is configured to be fixed on the foot part (7) by means of a detent device (20), which has a hand-operable engagement element (21) that interacts with a receiving part (19) formed on a spindle part (15) in order to fix the detent device, wherein the engagement element (21) is formed on the positioning element (5) on the front side of the working head, and is configured to be displaced relative to the receiving part (19) together with the positioning element (5), wherein the positioning element (5) is held in a groove guide (9) in the foot part (7) in a form-fitting yet displaceable manner, the groove guide (9) encasing the positioning element on three sides, and wherein the pipe cutting device (1) maintains an outside contour with respect to a length in a longitudinal direction (L) and a width extending transverse thereto regardless of a displacement position of the positioning element (5), wherein once the engagement between a toothing section of the engagement element and the receiving part is disengaged, the positioning element with the connecting element and the engagement element is displaceable in the groove guide.

2. The pipe cutting device according to claim 1, wherein the spindle part (15) is stationary in the foot part (7) with respect to a movement in a direction of a longitudinal axis z of the receiving part (19).

3. The pipe cutting device according to claim 2, wherein the spindle part (15) is rotatable about a longitudinal axis (z) in order to precisely adjust the opening width (w).

4. The pipe cutting device according to claim 1, wherein the positioning element (5) is configured to be displaced between a stop position on the working head (3) and a stop position on the foot part.

5. The pipe cutting device according to claim 1, wherein the positioning element (5) is pretensioned into a stop position on the foot part (7) by means of a spring (29).

6. The pipe cutting device according to claim 1, wherein the detent device is configured such that fixation of the detent device can be overrun in a direction of a reduction of the opening width (w).

7. The pipe cutting device according to claim 1, wherein the engagement element (21) is pretensioned into an engagement position.

8. The pipe cutting device according to claim 1, wherein a cutting element (10) is formed on the positioning element (5), and wherein the counter-support (4) is formed on a stationary part of the working head (3).

* * * * *